United States Patent
Faruque et al.

(10) Patent No.: US 12,365,297 B2
(45) Date of Patent: Jul. 22, 2025

(54) ROTATABLE WHEEL DEFLECTOR

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/066,437

(22) Filed: Dec. 15, 2022

(65) Prior Publication Data

US 2024/0198940 A1  Jun. 20, 2024

(51) Int. Cl.
*B60R 19/00* (2006.01)

(52) U.S. Cl.
CPC ........ *B60R 19/00* (2013.01); *B60R 2019/002* (2013.01); *B60R 2019/007* (2013.01)

(58) Field of Classification Search
CPC ........ B60R 2019/002; B60R 2019/007; B60R 19/00; B60R 19/40; B60R 19/16; B60R 19/26; B60R 2021/0023; B60R 21/38; B62D 21/155; B62D 21/152
See application file for complete search history.

(56) References Cited

U.S. PATENT DOCUMENTS

| | | | | |
|---|---|---|---|---|
| 2,196,561 A | * | 4/1940 | Lester | B60R 19/04 293/154 |
| 2,222,404 A | * | 11/1940 | Cookenboo | B60R 19/14 293/150 |
| 2,508,836 A | * | 5/1950 | Morris | B60R 19/16 293/125 |
| 2,519,429 A | * | 8/1950 | Brandvold | B60R 19/16 293/135 |
| 3,499,661 A | * | 3/1970 | Kemp, Jr. | B60R 19/285 293/135 |
| 3,820,834 A | * | 6/1974 | Wilfert et al. | B60R 19/26 293/137 |
| 3,823,968 A | * | 7/1974 | Barenyi | B60R 19/26 293/137 |
| 3,840,260 A | * | 10/1974 | Wacker | B60R 19/26 293/137 |
| 3,907,352 A | * | 9/1975 | Spain | B60R 19/04 293/149 |
| 3,997,209 A | * | 12/1976 | Chika | B60R 19/16 293/125 |
| D245,597 S | * | 8/1977 | Gee | D12/169 |
| 4,148,505 A | * | 4/1979 | Jensen | B62D 21/152 280/784 |
| 4,182,529 A | * | 1/1980 | Taylor | B60R 19/26 180/274 |

(Continued)

*Primary Examiner* — Timothy Wilhelm
(74) *Attorney, Agent, or Firm* — Frank A. MacKenzie; Brooks Kushman P.C.

(57) ABSTRACT

A vehicle includes a vehicle frame and a swing arm rotatably coupled to the vehicle frame at a rotatable connection. A track curves along a curved path. The track is fixed relative to the swing arm and spaced from the rotatable connection. An anchor is fixed relative to the vehicle frame. The track is slideably engaged with the anchor along the curved path of the track. A pyrotechnic actuator is between the vehicle frame and the swing arm.

20 Claims, 7 Drawing Sheets

(56) References Cited

U.S. PATENT DOCUMENTS

| | | | | |
|---|---|---|---|---|
| 4,251,096 A * | 2/1981 | Stock | B60R 19/26 | 293/126 |
| 4,291,911 A * | 9/1981 | Gallmeyer | B62D 35/005 | 296/91 |
| 5,275,436 A * | 1/1994 | Pomero | B62D 25/08 | 296/187.03 |
| 5,632,518 A * | 5/1997 | Kendall | B60R 19/38 | 293/118 |
| 6,338,510 B1 * | 1/2002 | Kanamori | B60R 19/26 | 293/154 |
| 6,511,119 B2 * | 1/2003 | Takase | B62D 21/152 | 296/203.02 |
| 6,623,054 B1 * | 9/2003 | Palmquist | B60R 19/40 | 180/274 |
| 6,764,118 B2 * | 7/2004 | DePottey | B60R 19/40 | 293/118 |
| 6,767,039 B2 * | 7/2004 | Bird | B60R 19/14 | 293/154 |
| 6,866,115 B2 * | 3/2005 | Miyasaka | B62D 21/152 | 180/311 |
| 6,926,322 B2 * | 8/2005 | Browne | B60R 19/40 | 293/118 |
| 6,942,261 B2 * | 9/2005 | Larsen | F15B 15/19 | 180/274 |
| 6,957,846 B2 * | 10/2005 | Saeki | B62D 21/152 | 296/187.1 |
| 7,063,364 B2 * | 6/2006 | Bird | B60R 19/38 | 293/118 |
| 7,596,833 B2 * | 10/2009 | Erwin | E05D 11/00 | 16/370 |
| 7,775,582 B2 * | 8/2010 | Browne | B62D 35/005 | 296/180.1 |
| 7,819,218 B2 * | 10/2010 | Eichberger | B60R 19/00 | 180/274 |
| 7,926,847 B2 * | 4/2011 | Auer | B62D 21/152 | 293/114 |
| 8,201,306 B2 * | 6/2012 | Kim | E05F 1/1215 | 16/361 |
| 8,353,380 B2 * | 1/2013 | Schonberger | B60R 19/40 | 180/274 |
| 8,807,632 B2 * | 8/2014 | Ramoutar | B60R 19/24 | 293/133 |
| 8,985,258 B1 * | 3/2015 | Midoun | B62D 21/152 | 180/274 |
| 8,991,544 B1 * | 3/2015 | Stratten | B60R 19/023 | 180/274 |
| 9,010,845 B1 * | 4/2015 | Ramoutar | B60R 19/14 | 296/187.1 |
| 9,067,469 B2 * | 6/2015 | Asjad | B62D 21/155 | |
| 9,079,619 B2 * | 7/2015 | Gupta | B62D 21/09 | |
| 9,120,507 B1 * | 9/2015 | Alwan | B62D 25/082 | |
| 9,126,550 B2 * | 9/2015 | Nusier | B60R 19/14 | |
| 9,193,318 B2 * | 11/2015 | Barbat | B62D 21/152 | |
| 9,327,763 B2 * | 5/2016 | Maier | B60R 19/00 | |
| 9,376,143 B2 * | 6/2016 | Alavandi | B62D 25/082 | |
| 9,394,005 B1 * | 7/2016 | Enders | B60R 19/00 | |
| 9,446,795 B2 * | 9/2016 | Jung | B62D 25/082 | |
| 9,527,466 B2 * | 12/2016 | Kalandek | B60R 21/00 | |
| 9,598,032 B1 | 3/2017 | Misikir et al. | | |
| 9,676,367 B2 * | 6/2017 | Barron | B60R 19/54 | |
| 9,908,560 B2 * | 3/2018 | Nusier | B60R 19/24 | |
| 10,232,818 B2 * | 3/2019 | Jenny | B60R 21/36 | |
| 11,691,581 B1 * | 7/2023 | Lazaro | B60R 21/36 | 180/274 |
| 11,718,346 B2 * | 8/2023 | Jaradi | B62D 37/02 | 280/784 |
| 2002/0121788 A1 * | 9/2002 | Zeppetzauer | B60R 19/38 | 293/125 |
| 2005/0110284 A1 * | 5/2005 | Browne | B60R 19/40 | 293/118 |
| 2007/0132223 A1 * | 6/2007 | Scheffzuek | B62D 21/155 | 180/311 |
| 2008/0157547 A1 * | 7/2008 | Baumann | B60R 19/40 | 293/118 |
| 2017/0088091 A1 * | 3/2017 | Ginn | B60R 21/34 | |

* cited by examiner

ROTATABLE WHEEL DEFLECTOR

BACKGROUND

During certain vehicle impacts, e.g., certain offset frontal impacts of a vehicle, the direction the impact is offset from major structural components of the vehicle. Offset front impacts can be simulated with standardized tests like small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier. In this frontal offset impact mode, various suspension and steering components will move with one another as deformation progresses.

DETAILED DESCRIPTION

Figure 1:
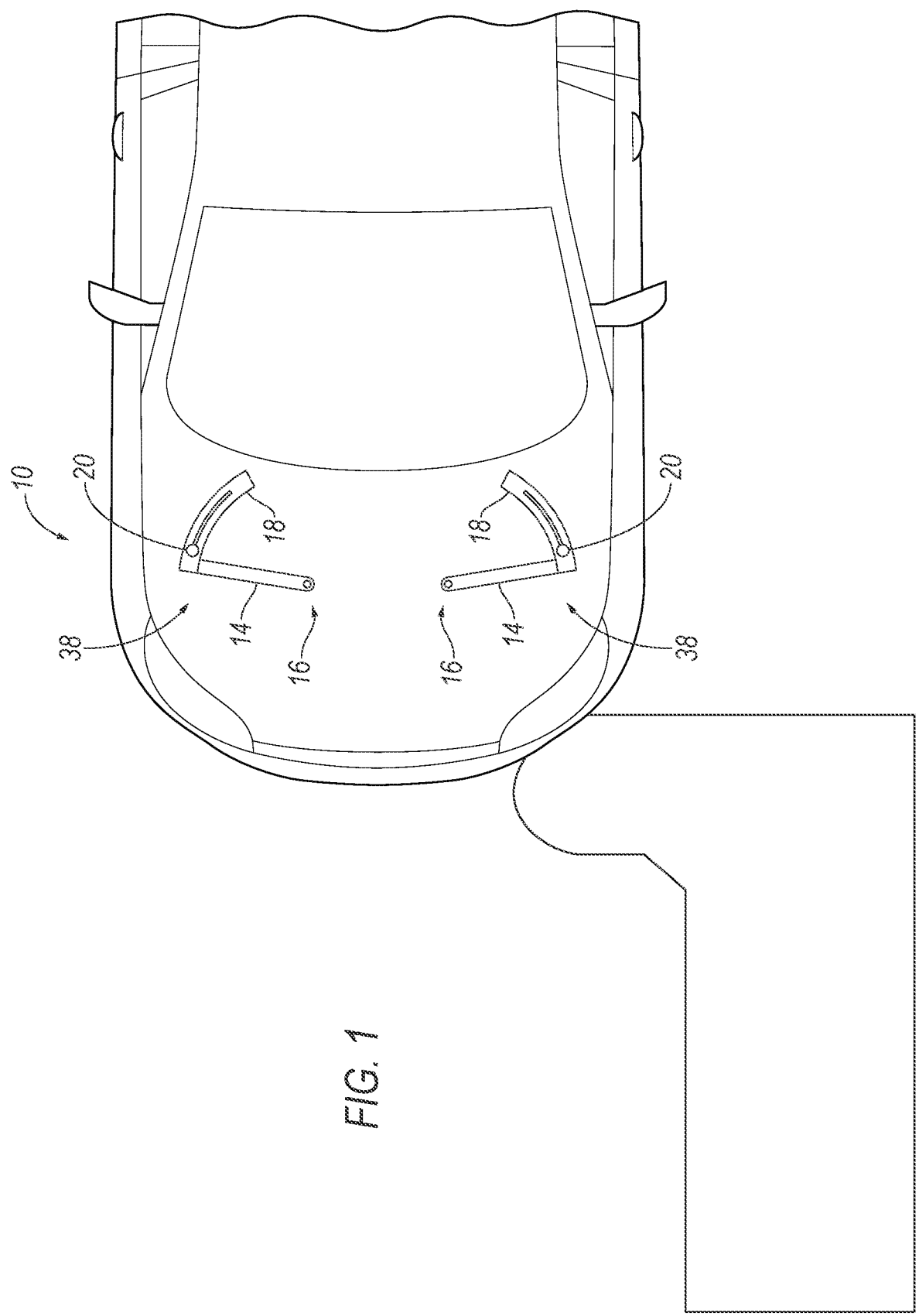
FIG. 1 is a plan view of a vehicle during a small-offset rigid-barrier (SORB) frontal impact test with a rotatable wheel deflector of the vehicle shown in broken lines in an undeployed position.

A vehicle includes a vehicle frame and a swing arm rotatably coupled to the vehicle frame at a rotatable connection. A track curves along a curved path. The track is fixed relative to the swing arm and is spaced from the rotatable connection. An anchor is fixed relative to the vehicle frame. The track is slideably engaged with the anchor along the curved path of the track. A pyrotechnic actuator between the vehicle frame and the swing arm.

The swing arm and track may move as a unit relative to the anchor about the rotatable connection from an undeployed position to a deployed position.

The track may include a slot elongated along the curved path and the anchor is slideably engaged with the slot. The anchor may include a head and a shaft extending from the head through the slot to the vehicle frame.

The pyrotechnic actuator may be operatively coupled with the vehicle frame and the swing arm to rotate the swing arm relative to the vehicle frame about the rotatable connection from an undeployed position to a deployed position. The vehicle may include a wheel well, the swing arm being outside of the wheel well in the undeployed position and the swing arm being in the wheel well in the deployed position.

The swing arm and the track may each be elongated in a generally horizontal plane.

The track may be supported on the vehicle frame by the anchor. The swing arm may be elongated from a first end to a second end, the first end of the swing arm being fixed to the track and the second end of the swing arm being supported on the anchor by the track.

The swing arm may be supported on the anchor by the track.

The vehicle may include a wheel well and the swing arm and track may move together as a unit from an undeployed position outside of the wheel well to a deployed position in the wheel well.

The curved path of the track may be a circular arc having a center at the pivot joint. The pyrotechnic actuator may be operatively coupled with the vehicle frame and the swing arm to rotate the swing arm about the rotatable connection from an undeployed position to a deployed position. The vehicle includes a wheel well, the swing arm being outside of the wheel well in the undeployed position and the swing arm being in the wheel well in the deployed position.

The vehicle may include a lock designed to lock the swing arm and the track relative to the frame in the deployed position. The lock may engage the anchor in the deployed position. The track may include a slot having a closed end and the lock may be designed to trap the anchor between the closed end and the lock in the deployed position.

The swing arm may be elongated vehicle-outboard from the rotatable connection to the track. The track may include a slot elongated along the curved path transverse to the swing arm. The swing arm may be elongated along an axis from a first end of the swing arm at the rotatable connection to a second end of the swing arm. The track may be fixed relative to the swing arm along the axis.

With reference to the Figures, wherein like numerals indicate like parts throughout the several views, a vehicle 10 includes a vehicle frame 12 and a swing arm 14 rotatably coupled to the vehicle frame 12 at a rotatable connection 16. A track 18 curves along a curved path P. The track 18 is fixed relative to the swing arm 14 and spaced from the rotatable connection 16. An anchor 20 is fixed relative to the vehicle frame 12. The track 18 is slideably engaged with the anchor 20 along the curved path P of the track 18. A pyrotechnic actuator 22 is between the vehicle frame 12 and the swing arm 14.

Figure 3:
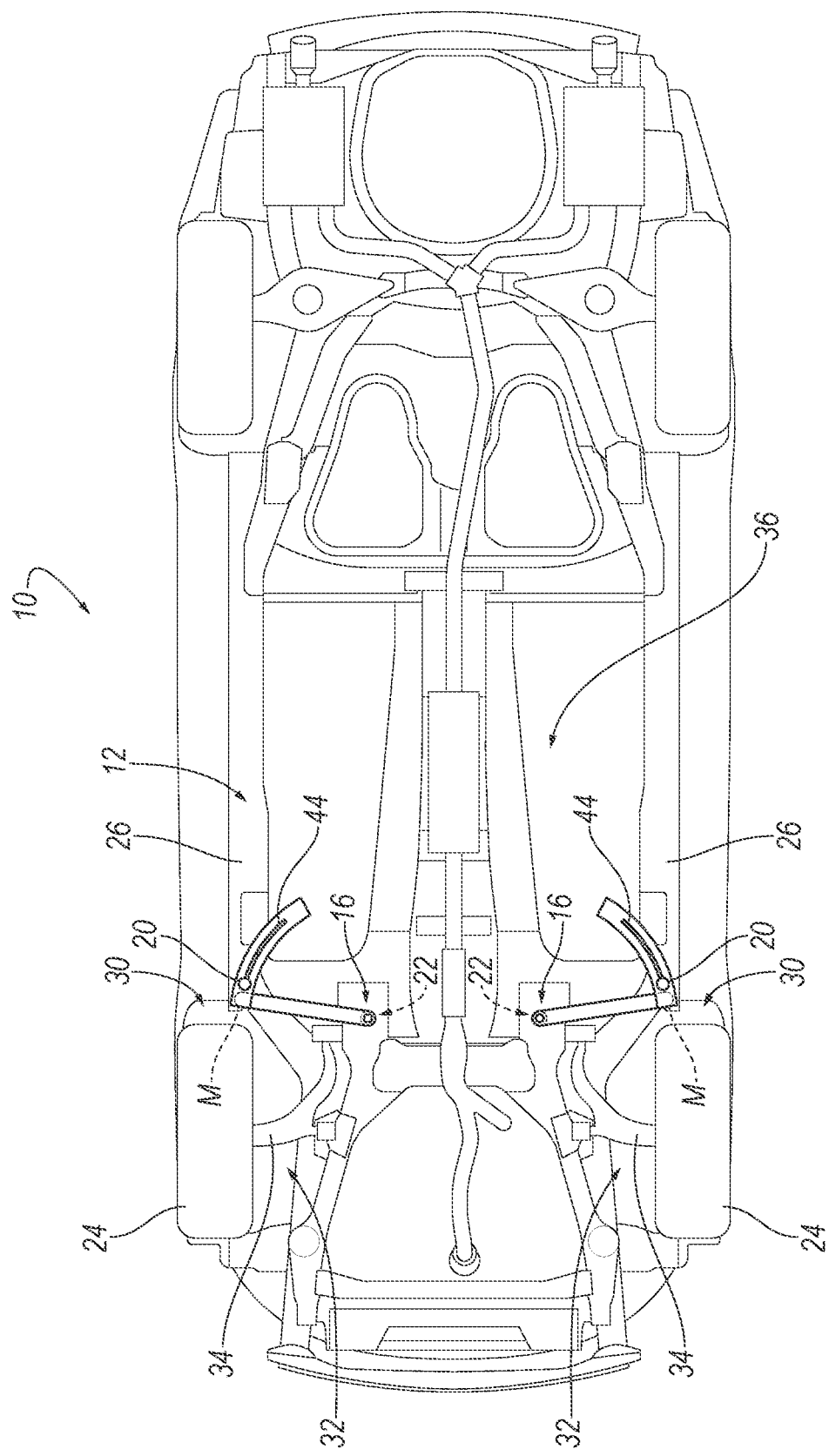
FIG. 3 is a bottom view of the vehicle with the rotatable wheel deflector in the undeployed position.
Figure 4:
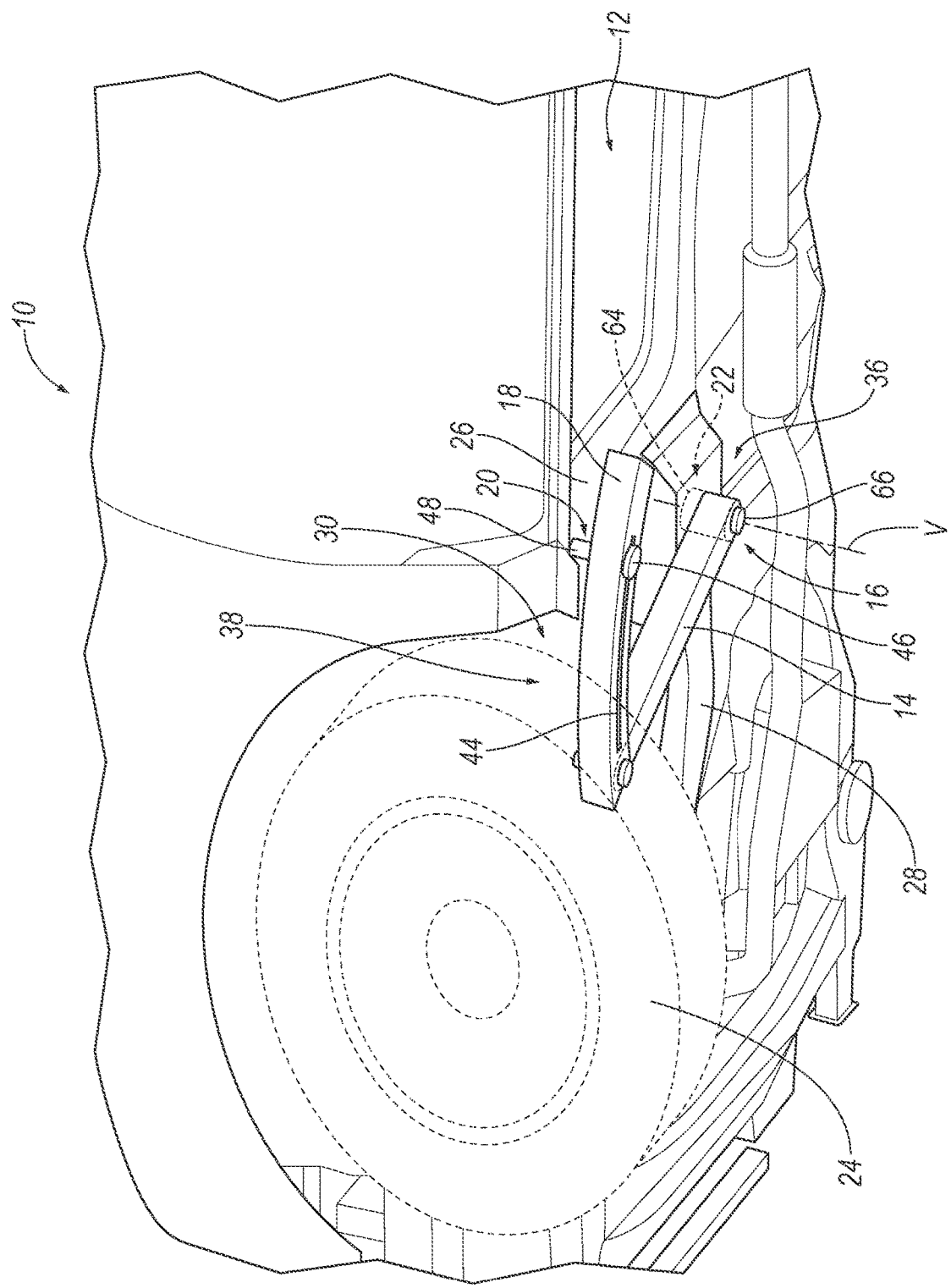
FIG. 4 is a perspective view of a bottom of the vehicle with the rotatable wheel deflector in a deployed position.
Figure 5:
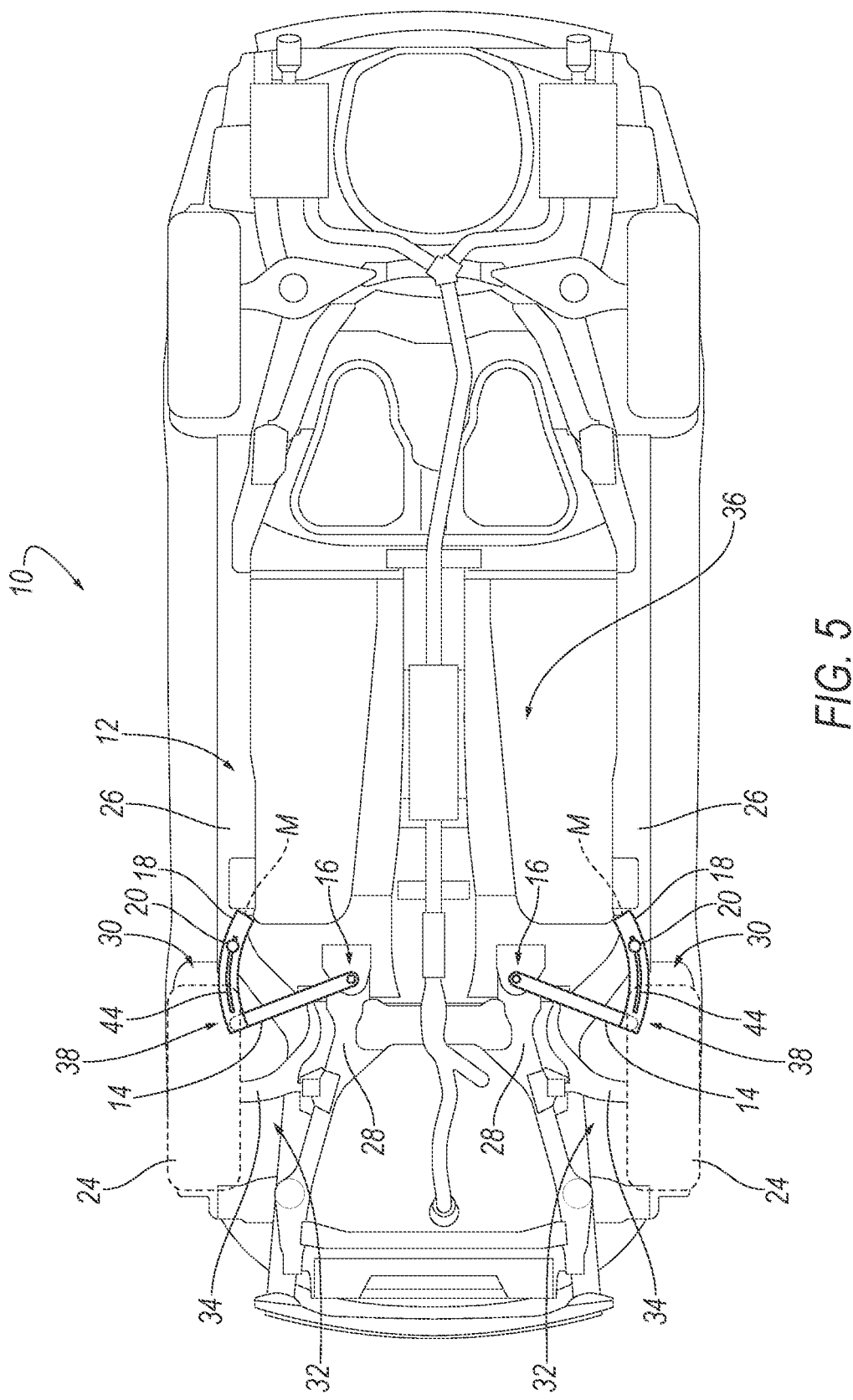
FIG. 5 is a bottom view of the vehicle with the rotatable wheel deflector in the deployed position.

During certain impacts of the vehicle 10, e.g., a small-offset rigid-barrier (SORB) frontal crash test as shown in FIG. 1, the pyrotechnic actuator 22 rotates the swing arm 14 and the track 18 relative to the vehicle frame 12 from an undeployed position (FIGS. 2-3) to a deployed position (FIGS. 4-5). In the deployed position, the swing arm 14 is positioned to apply a vehicle-outboard force to a wheel 24 of the vehicle 10 in the event of inboard movement of the wheel 24 during certain vehicle impacts. For example, in the event that force of the rigid barrier of a SORB frontal crash test drives the wheel 24 in a vehicle-rearward direction and/or vehicle inboard direction the swing arm 14 in the deployed position biases the wheel 24 vehicle-outboard. Since the swing arm 14 is rotatably coupled to the vehicle frame 12 at the rotatable connection 16, the swing arm 14 rotates about the rotatable connection 16 from the undeployed position to the deployed position. The track 18 and the swing arm 14 rotate relative to the vehicle frame 12 along the curved path P of the track 18. This rotatable deployment from the undeployed position to the deployed position reduces packaging constraints and allows for deployment of the swing arm 14 to a position to apply vehicle-outboard force to a wheel 24 of the vehicle 10 in the event of inboard movement of the wheel 24 during certain vehicle impact.

With reference to FIGS. 1-5, the vehicle 10 may be of any suitable type, e.g., a passenger automobile such as a car, truck, sport-utility vehicle 10, etc. The vehicle 10 includes a vehicle body. The vehicle 10 may be of a unibody construction, i.e., a unitary-body construction, in which the vehicle frame 12 and the vehicle body are a single component, i.e., the vehicle body is the vehicle frame 12 in the unibody construction. In the unibody construction, components of the vehicle frame 12, e.g., longitudinal and/or cross-vehicle frame rails, rockers 26, pillars, roof rails, etc., support body panels and other components of the vehicle 10. In the unibody construction, the vehicle 10 may include a subframe 28 that supports, for example, powertrain components such as an engine and other components. In other examples, the vehicle 10 may have a body-on-frame construction in which the vehicle frame 12 and the vehicle body are separate components and the vehicle frame 12 supports the vehicle body frame. In other examples, the vehicle frame 12 and the vehicle body may have any suitable construction. The vehicle frame 12 and vehicle body may be of any suitable material, for example, steel, aluminum, and/or fiber-reinforced plastic, etc.

The vehicle body includes a wheel well 30. The wheel well 30 defines an envelope that receives the wheel 24 of the vehicle 10. The wheel well 30 may be defined by body panels, cladding, etc.

The wheel 24 of the vehicle 10 transmits rotational force from the vehicle powertrain to the road surface to propel the vehicle 10 relative to the road surface. The wheel 24 may be of any suitable type including, for example, those currently known. The wheel 24 may include a rim and a tire.

Figure 2:
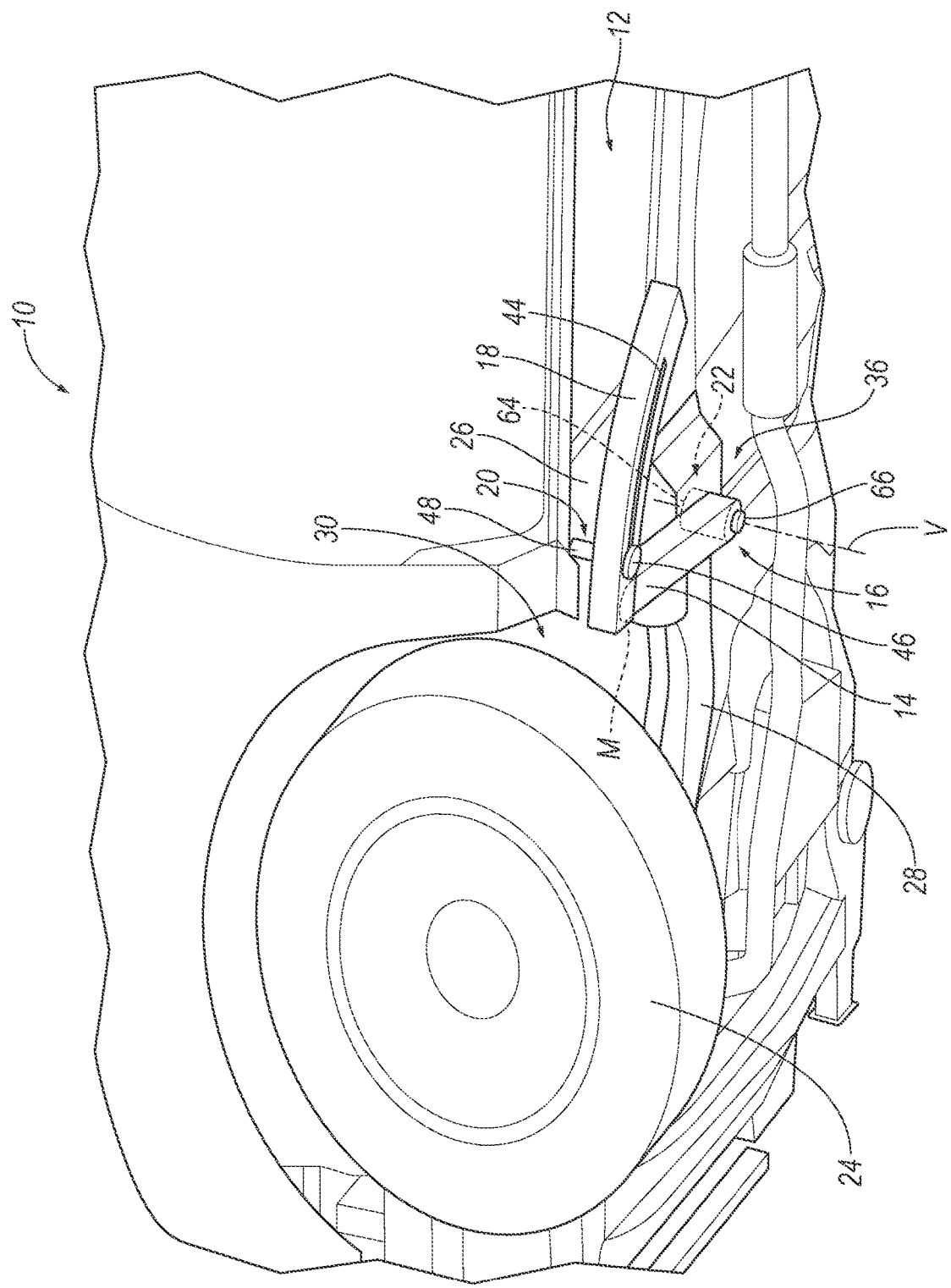
FIG. 2 is a perspective view of a bottom of the vehicle with the rotatable wheel deflector in the undeployed position.

With reference to FIGS. 1-3, the vehicle 10 includes a suspension system 32. The suspension system 32 may be, for example, a MacPherson suspension system, a short-arm and long-arm suspension system (SLA), or any other suitable type of suspension system 32. The suspension system 32 is a front suspension system. In other words, the wheel 24 is a front wheel. The suspension system 32 of FIGS. 2 and 5 is shown on the left side of the vehicle 10 and the suspension system 32 on the right side of the vehicle 10 may be a mirror image of that shown in FIGS. 2-5.

The suspension system 32 includes at least one suspension arm 34. At least a portion of the suspension arm 34 may be in the wheel well 30. The suspension arm 34 pivots relative to the vehicle frame 12, i.e., up and down, to allow the wheel 24 to travel relative to the vehicle frame 12. The suspension arm 34 may be, for example, a control arm. The suspension arm 34 includes at least one point of attachment to the vehicle frame 12. The suspension system 32 may include other components, e.g., a shock, a strut, etc. The wheel 24 is coupled to the suspension arm 34. In other words, the suspension arm 34 directly or indirectly interacts with the wheel 24 to control the wheel 24.

The vehicle 10 includes an underbody 36. The underbody 36 faces the road surface below the vehicle 10. The underbody 36 may, for example, include bottom surfaces of the vehicle 10 such as that of components of the vehicle frame 12, vehicle body, etc., including, for example, rails, panels, pans, etc.

The vehicle 10 includes a rotatable wheel deflector 38 including the swing arm 14, the track 18, the anchor 20, and the pyrotechnic actuator 22. The swing arm 14 and track 18 the move as a unit relative to the anchor 20 about the rotatable connection 16 from the undeployed position to the deployed position. Specifically, the pyrotechnic actuator 22 rotates the swing arm 14 relative to the vehicle frame 12 and the track 18 moves with the swing arm 14. As the swing arm 14 and the track 18 rotate from the undeployed position to the deployed position, the track 18 slides along the anchor 20 and the anchor 20 guides movement of the track 18 and the swing arm 14.

The rotatable wheel deflector 38 moves relative to the vehicle frame 12 and the wheel 24 from the undeployed position to the deployed position. Specifically, the rotatable wheel deflector 38 may be outside the wheel well 30 in the undeployed position and may be moveable into the wheel well 30 from the undeployed position to the deployed position. In the example shown in FIGS. 4-5, the swing arm 14 and the track 18 are in the wheel well 30, in other words, a portion of the swing arm 14 and a portion of the track 18 are in the wheel well 30. In FIGS. 4-5, the wheel 24 is shown in its position prior to vehicle impact for illustrative purposes.

The swing arm 14 and the track 18 move in a generally horizontal plane from the undeployed position to the deployed position. Specifically, the swing arm 14 rotates about a rotational axis R, which may be generally vertical, from the undeployed position to the deployed position.

The rotatable wheel deflector 38 is mounted to the underbody 36 of the vehicle 10. For example, in the example shown in the Figures, the rotatable wheel deflector 38 is mounted to the vehicle frame 12. Specifically, as described further below, the rotatable wheel deflector 38 is mounted to the vehicle frame 12 at a rocker 26 and at the subframe 28 in the example shown in the Figures. The rotatable wheel deflector 38 may include a covering (not shown) that conceals the swing arm 14, track 18, anchor 20, and pyrotechnic actuator 22 from the road surface below the vehicle 10. In examples including the covering, the swing arm 14 and the track 18 may release the covering from the underbody 36 and/or may break the covering as the rotatable wheel deflector 38 rotates from the undeployed position to the deployed position. The covering may be, for example, plastic.

The swing arm 14 includes a first end 40 and a second end 42 and is elongated from the first end 40 to the second end 42. Specifically, the swing arm 14 is elongated along an axis S through the first end 40 and the second end 42. The swing arm 14 is elongated in the generally horizontal plane, i.e., the axis S of the swing arm 14 may be generally horizontal.

The first end 40 is vehicle 10 inboard of the second end 42 in the undeployed position and in the deployed position. In other words, the axis S of the swing arm 14 has a vehicle-outboard component from the first end 40 to the second end 42.

The swing arm 14 is rotatably coupled to the vehicle frame 12 at the rotatable connection 16. The swing arm 14 is rotatable relative to the vehicle frame 12 from the undeployed position to the deployed position about the rotatable connection 16. As one example, as shown in the example in the Figures, the rotatable connection 16 may be at the pyrotechnic actuator 22. For example, the rotatable connection 16 may be a component of the pyrotechnic actuator 22, as described further below. The first end 40 of the swing arm 14 is at the rotatable connection 16. The first end 40 of the swing arm 14 may be supported by the vehicle frame 12 at the rotatable connection 16. In other words, the weight of the first end 40 is born by the vehicle frame 12 through the rotatable connection 16.

The second end 42 of the swing arm 14 is at the track 18. The track 18 is fixed relative to the swing arm 14 along the axis S. For example, in the example shown in the Figures, the track 18 is fixed directly to the swing arm 14 at the second end 42 such that the track 18 is immoveable relative to the swing arm 14 along the axis S. Specifically, the track 18 and the swing arm 14 move together as a unit from the undeployed position to the deployed position. The track 18 may be fixed to the second end 42 of the swing arm 14, for example, with fasteners, welding, brackets, etc.

The track 18 is supported on the vehicle frame 12 by the anchor 20. The second end 42 of the swing arm 14 may be supported on the anchor 20 by the track 18. In other words, the weight of the second end 42 of the swing arm 14 may be borne by the track 18 and the weight of the track 18 and the second end 42 of the swing arm 14 may be borne by the anchor 20 through the track 18 in the undeployed position and/or in the deployed position.

The swing arm 14 moves about the rotatable connection 16 from the undeployed position to the deployed position. In other words, the rotatable connection 16 defines a rotational axis R about which the swing arm 14 rotates. The rotational axis R may be, for example, generally vertical. Since the first end 40 of the swing arm 14 is at the rotatable connection 16, the second end 42 of the swing arm 14 rotates in a curved path of motion M as the swing arm 14 rotates from the undeployed position to the deployed position. In the example, shown in the Figures, the curved path of motion M of the second end 42 of the swing arm 14 moves is circular. Specifically, the curved path of motion M is a circular arc having a center at the rotatable connection 16.

The track 18 guides the movement of the second end 42 of the swing arm 14 along the curved path of motion M from the undeployed position to the deployed position. Specifically, the anchor 20 is disposed along the curved path P of the track 18 and the curved path of motion M of the second end 42 of the swing arm 14. The track 18 is slideably engaged with the anchor 20 along the curved path P of the track 18. In other words, the anchor 20 is on the curved path P and the track 18 slides relative to the anchor 20 on the curved path P. The curved path P of the track 18 guides the relative movement of the track 18 and the anchor 20 along the curved path P of the track 18.

The curved path P of track 18 overlaps the curved path of motion M of the second end 42 of the swing arm 14. In other words, the curved path P of the track 18 is on the curved path of motion M of the second end 42 of the swing arm 14 as the swing arm 14 rotates from the undeployed position to the deployed position. The connection of the first end 40 of the swing arm 14 at the rotational connection and the slideable engagement of track 18 with the anchor 20 at the second end 42 constrain rotation of the second end 42 from undeployed position to deployed position along the curved path of motion M. The connection to the vehicle frame 12 at both the rotatable connection 16 and the interface between the anchor 20 and the track 18 guides the movement of the rotatable wheel deflector 38 from the undeployed position to the deployed position and structurally reinforces rotatable wheel deflector 38 in the deployed position. Thus, the rotatable wheel deflector 38 exerts force on the wheel 24 in the event the wheel 24 is positioned to be contacted by the rotatable wheel deflector 38 in the wheel well 30 during certain vehicle impacts.

The track 18 may be elongated along the curved path P transverse to the swing arm 14. In other words, the curved path P of the track 18 crosses the axis S of the swing arm 14.

The anchor 20 is fixed relative to the vehicle frame 12. In other words, the anchor 20 is immoveable relative to the vehicle frame 12. The anchor 20 may be directly connected to the vehicle frame 12, as shown in the example in the Figures. For example, in the example shown in the Figures, the anchor 20 is a bolt threadedly engaged with a threaded hole on the vehicle frame 12. In such an example, the anchor 20 includes a head 46 and a shaft 48, e.g., a threaded shaft.

The track 18 may include or be a slot 44 slideably engaged with the anchor 20. For example, the slot 44 may be elongated along the curved path P. In such an example, the anchor 20 may extend through the slot 44 so that the slot 44 can slide along the anchor 20. For example, in the example shown in the Figures, the shaft 48 extends from the head 46 through the slot 44 to the vehicle frame 12. The head 46 is larger than the slot 44 to prevent disengagement of the anchor 20 from the track 18. In other examples in the alternative to the shaft 48 and/or slot 44 in the Figures, the track 18 and/or the anchor 20 may be of any suitable configuration and have any suitable type of slideable engagement to guide relative movement of the anchor 20 along the track 18.

The rotatable wheel deflector 38 may include a lock 50 designed to lock the swing arm 14 and the track 18 relative to the vehicle frame 12 in the deployed position. As an example, the lock 50 may engage the anchor 20 in the deployed position. Specifically, the lock 50 may engage the anchor 20 to prevent relative movement of the swing arm 14 and the track 18 relative to the vehicle frame 12 after the swing arm 14 and the track 18 reach the deployed position.

In the example shown in the Figures, the slot 44 has a closed end 52 and the lock 50 is designed to trap the anchor 20 between the closed end 52 and the lock 50 in the deployed position. Specifically, when the lock 50 may be designed to allow the anchor 20 to move past the lock 50 in the slot 44 such that the anchor 20 can move to the closed end 52 in the deployed position and the lock 50 may be designed to prevent movement of the anchor 20 past the lock 50 after the swing arm 14 and track 18 are in the deployed position. This traps the anchor 20 between the closed end 52 and the lock 50 to maintain the rotatable wheel deflector 38 in the deployed position.

Figures 6A, 6B:
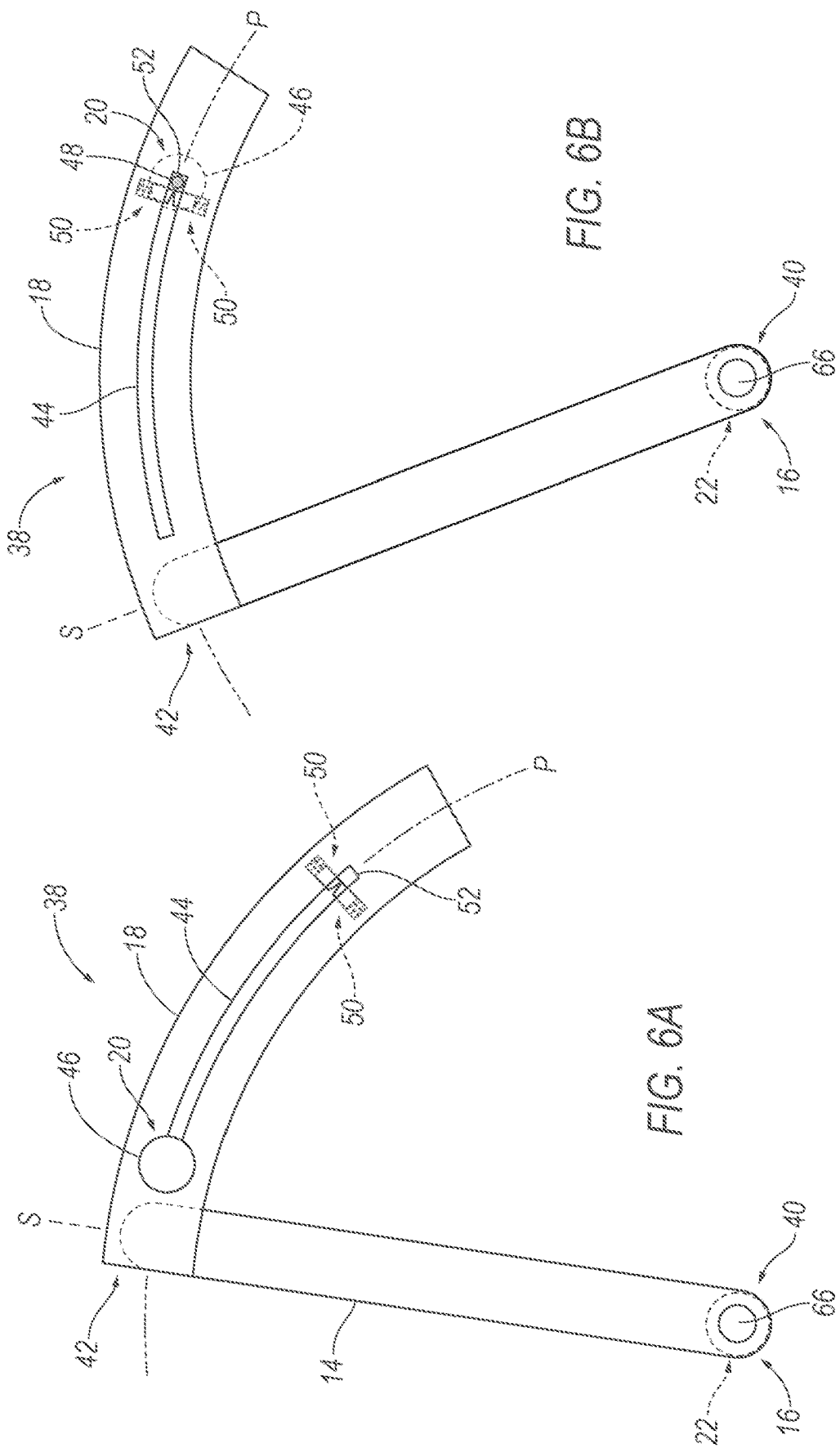
FIG. 6A is a bottom view of the rotatable wheel deflector in the undeployed position with a lock shown in broken lines.
FIG. 6B is a bottom view of the rotatable wheel deflector in the deployed position.
Figure 7:
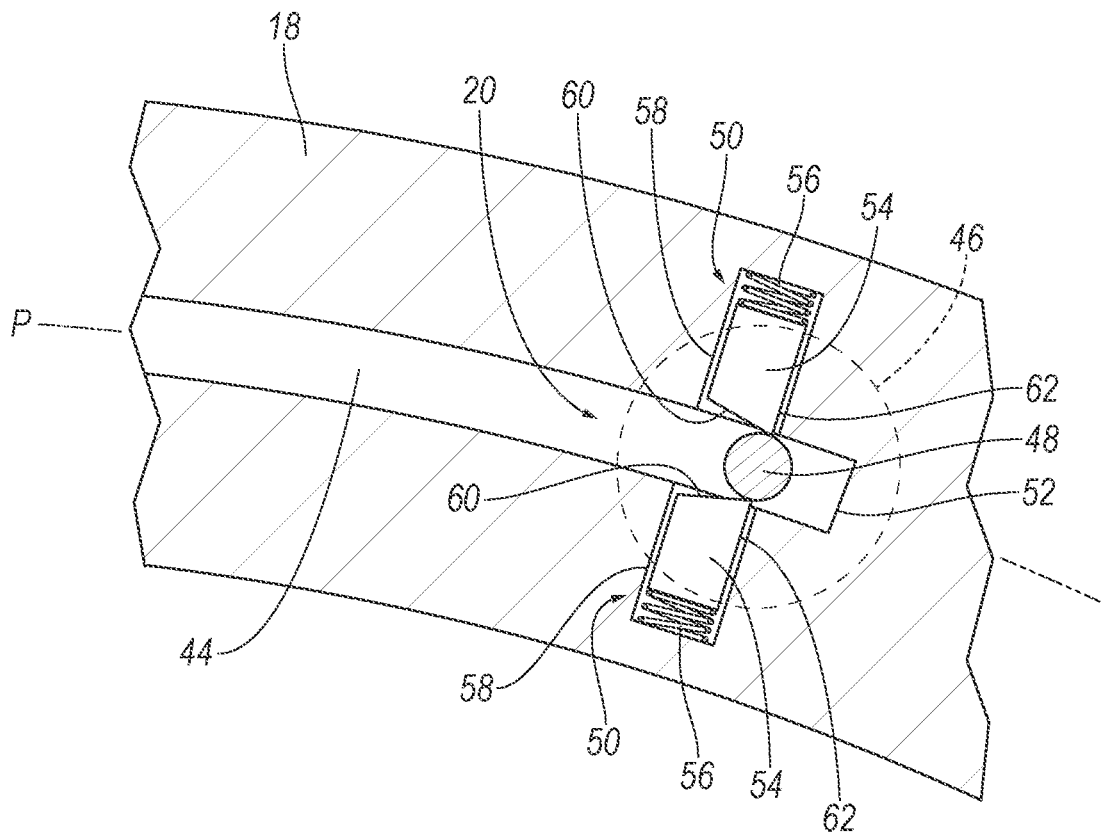
FIG. 7 is a magnified view of the lock in the deployed position.

With reference to FIGS. 6A-7, the lock 50 may include a pin 54 slideably retained to a cavity 58 in the track 18. Specifically, the lock 50 includes a spring 56 retained in a cavity 58 of the track 18. In that example, the pin 54 extends into the slot 44 such that the anchor 20 depresses the pin 54 into the cavity 58 as the anchor 20 moves past the cavity 58 as the track 18 moves to the deployed position. After the anchor 20 moves past the pin 54, the spring 56 returns the pin 54 into the slot 44 and prevents movement of the anchor 20 past the pin 54 away from the deployed position. In the example shown in the Figures, the pin 54 include a ramped surface 60 facing the anchor 20 in the undeployed position and a stop face 62 facing the anchor 20 in the deployed position. The ramped surface 60 is configured to allow the anchor 20 to ride along the ramped surface 60 to depress the pin 54 into the cavity 58 against the bias of the spring 56. For example, the ramped surface 60 is at a non-right angle to a wall of the slot 44 so that the anchor 20 rides along the ramped surface 60 and depresses the pin 54 into the cavity 58. The stop face 62 is configured to prevent the anchor 20 from passing the pin 54 when the anchor 20 abuts the stop face 62. The stop face 62 may be perpendicular to the wall of the slot 44 so that the anchor 20 abuts the stop face 62 face without depressing the pin 54 against the bias of the spring 56.

In the example shown in FIGS. 6A-7, the lock 50 includes two pins 54 opposing each other with each pin 54 loaded in the cavity 58 with the spring 56. The pins 54 oppose each other such that the anchor 20 moves the pins 54 away from each other into their respective cavity 58 against the bias of their respective spring 56. When the track 18 is in the stowed position, e.g., with the anchor 20 abutting the closed end 52, the pins 54 are extended into the slot 44 so that the anchor 20 abuts the stop faces 62 of both pins 54 if the anchor 20 moves toward the pins 54 from the deployed position.

The swing arm 14, the track 18, and the anchor 20 are sufficiently rigid to deflect a wheel 24 in the scenario in which the wheel 24 moves inboard during certain vehicle impacts as described above. The swing arm 14, the track 18, and the anchor 20 may be, for example, metal.

The pyrotechnic actuator 22 between the vehicle frame 12 and the swing arm 14. In the example shown in the Figures, the pyrotechnic actuator 22 is mounted to the vehicle frame 12 and connected to swing arm 14 to move the swing arm 14 relative to the vehicle frame 12. In other words, the pyrotechnic actuator 22 is anchored to the vehicle frame 12, e.g., with threaded fasteners.

The pyrotechnic actuator 22 may be rotary actuator that includes a cylinder 64 and a rotary piston 66 in the cylinder 64. In such an example, the rotary piston 66 rotates relative to the cylinder 64 when the pyrotechnic actuator 22 is activated. As an example, the cylinder 64 may be mounted to the vehicle frame 12, e.g., with threaded fasteners, and the rotary piston 66 may be connected to the swing arm 14 to move the swing arm 14 relative to the vehicle frame 12 when the rotary piston 66 rotates relative to the cylinder 64.

The pyrotechnic actuator 22 includes a pyrotechnic charge (not shown) in the cylinder 64 that rotates the rotary piston 66 relative to the cylinder 64. The pyrotechnic charge is combustible to produce a gas that drives the rotary piston 66 relative to the cylinder 64. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The pyrotechnic actuator 22 is operatively coupled with the vehicle frame 12 and the swing arm 14 to rotate the swing arm 14 relative to the vehicle frame 12 about the rotatable connection 16 from the undeployed position to the deployed position. In other words, the pyrotechnic actuator 22 includes two components moveable relative to each other and coupled, indirectly or directly connected, to the vehicle frame 12 and the swing arm 14 such that activation of the pyrotechnic actuator 22 moves the swing arm 14 relative to the vehicle frame 12. As one example, as described above, the pyrotechnic actuator 22 may include the cylinder 64 mounted to the vehicle frame 12 and the rotary piston 66 connected to the swing arm 14 to move the swing arm 14 relative to the vehicle frame 12 when the rotary piston 66 rotates relative to the cylinder 64.

As set forth above, the pyrotechnic actuator 22 may be or include the rotatable connection 16 between the swing arm 14 and the vehicle frame 12. In the example shown in the Figures, the rotatable connection 16 is a component of the pyrotechnic actuator 22, and specifically, the rotary piston 66 and the cylinder 64 are the rotatable connection 16. In other examples, the rotatable connection 16 between the swing arm 14 and the vehicle frame 12 may be a pivot joint between the rotatable swing arm 14 and the vehicle frame 12 (e.g., a post fixed to the vehicle frame 12 and rotatably engaged with the swing arm 14). In some examples, the pyrotechnic actuator 22 may be spaced from the rotatable connection 16, e.g., connected to the swing arm 14 spaced from the rotatable connection 16 to rotate the swing arm 14 about the rotatable connection 16.

The disclosure has been described in an illustrative manner, and it is to be understood that the terminology which has been used is intended to be in the nature of words of description rather than of limitation. The numerical adjectives "first" and "second" are used herein as identifiers and do not indicate order or importance. Many modifications and variations of the present disclosure are possible in light of the above teachings, and the disclosure may be practiced otherwise than as specifically described.

What is claimed is:

1. A vehicle comprising:
a vehicle frame;
a swing arm rotatably coupled to the vehicle frame at a rotatable connection;
a track curving along a curved path, the track being fixed relative to the swing arm and spaced from the rotatable connection;
an anchor fixed relative to the vehicle frame, the track being slideably engaged with the anchor along the curved path of the track;
a pyrotechnic actuator between the vehicle frame and the swing arm; and
a wheel well, the swing arm being outside of the wheel well in the undeployed position and the swing arm being in the wheel well in the deployed position.

2. The vehicle as set forth in claim 1, wherein the swing arm and track move as a unit relative to the anchor about the rotatable connection from an undeployed position to a deployed position.

3. The vehicle as set forth in claim 1, wherein the track includes a slot elongated along the curved path, and the anchor is slideably engaged with the slot.

4. The vehicle as set forth in claim 3, wherein the anchor incudes a head and a shaft extending from the head through the slot to the vehicle frame.

5. The vehicle as set forth in claim 1, wherein the swing arm and the track are each elongated in a generally horizontal plane.

6. The vehicle as set forth in claim 1, wherein the swing arm is supported on the anchor by the track.

7. The vehicle as set forth in claim 1, wherein the swing arm and track move together as a unit from an undeployed position outside of the wheel well to a deployed position in the wheel well.

8. The vehicle as set forth in claim 1, wherein the curved path of the track is a circular arc having a center at the rotatable connection.

9. The vehicle as set forth in claim 8, wherein the pyrotechnic actuator is operatively coupled with the vehicle frame and the swing arm to rotate the swing arm about the rotatable connection from an undeployed position to a deployed position.

10. The vehicle as set forth in claim 9, wherein the vehicle includes a wheel well, the swing arm being outside of the wheel well in the undeployed position and the swing arm being in the wheel well in the deployed position.

11. The vehicle as set forth in claim 1, further comprising a lock designed to lock the swing arm and the track relative to the frame in the deployed position.

12. The vehicle as set forth in claim 11, wherein the lock engages the anchor in the deployed position.

13. The vehicle as set forth in claim 12, wherein the track includes a slot having a closed end and the lock is designed to trap the anchor between the closed end and the lock in the deployed position.

14. The vehicle as set forth in claim 1, wherein the swing arm is elongated vehicle-outboard from the rotatable connection to the track.

15. The vehicle as set forth in claim 14, wherein the track includes a slot elongated along the curved path transverse to the swing arm.

16. The vehicle as set forth in claim 14, wherein the swing arm is elongated along an axis from a first end of the swing arm at the rotatable connection to a second end of the swing arm, the track being fixed relative to the swing arm along the axis.

17. The vehicle as set forth in claim 1, wherein the track has a first end and a second end, the track is elongated from the first end of the track to the second end of the track, and the track being curved from the first end of the track to the second end of the track.

18. A vehicle comprising:
a vehicle frame;
a swing arm rotatably coupled to the vehicle frame at a rotatable connection;
a track curving along a curved path, the track being fixed relative to the swing arm and spaced from the rotatable connection;
an anchor fixed relative to the vehicle frame, the track being slideably engaged with the anchor along the curved path of the track; and
a pyrotechnic actuator between the vehicle frame and the swing arm;
the pyrotechnic actuator being operatively coupled with the vehicle frame and the swing arm to rotate the swing arm relative to the vehicle frame about the rotatable connection from an undeployed position to a deployed position; and
a wheel well, the swing arm being outside of the wheel well in the undeployed position and the swing arm being in the wheel well in the deployed position.

19. The vehicle as set forth in claim 18, wherein the swing arm and track move as a unit relative to the anchor about the rotatable connection from an undeployed position to a deployed position.

20. A vehicle comprising:
a vehicle frame;
a swing arm rotatably coupled to the vehicle frame at a rotatable connection;
a track curving along a curved path, the track being fixed relative to the swing arm and spaced from the rotatable connection;
an anchor fixed relative to the vehicle frame, the track being slideably engaged with the anchor along the curved path of the track;
a pyrotechnic actuator between the vehicle frame and the swing arm:
the curved path of the track being a circular arc having a center at the rotatable connection;
the pyrotechnic actuator being operatively coupled with the vehicle frame and the swing arm to rotate the swing arm about the rotatable connection from an undeployed position to a deployed position; and
a wheel well, the swing arm being outside of the wheel well in the undeployed position and the swing arm being in the wheel well in the deployed position.

* * * * *